US012567958B1

(12) United States Patent
Du et al.

(10) Patent No.: US 12,567,958 B1
(45) Date of Patent: Mar. 3, 2026

(54) DYNAMICALLY ADAPTED UNIQUE KEY GENERATION AND VERIFICATION

(71) Applicant: Zoom Video Communications, Inc., San Jose, CA (US)

(72) Inventors: Yuanyuan Du, Hangzhou (CN); Jingjin Xie, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 42 days.

(21) Appl. No.: 18/781,741

(22) Filed: Jul. 23, 2024

(51) Int. Cl.
*H04L 29/06* (2006.01)
*H04L 9/08* (2006.01)

(52) U.S. Cl.
CPC .................................. *H04L 9/0861* (2013.01)

(58) Field of Classification Search
None
See application file for complete search history.

(56) References Cited

U.S. PATENT DOCUMENTS

| | | | | |
|---|---|---|---|---|
| 11,762,846 B1 * | 9/2023 | Atherton | ................. | G06F 16/27 |
| | | | | 713/193 |
| 12,099,615 B1 * | 9/2024 | Azaria | ................... | G06F 21/577 |
| 12,185,134 B1 * | 12/2024 | Duong | .................. | H04W 24/02 |
| 2021/0152366 A1 * | 5/2021 | Wang | ................... | G06Q 20/223 |
| 2021/0203491 A1 * | 7/2021 | Wei | ...................... | H04W 12/043 |
| 2025/0023714 A1 * | 1/2025 | Kumar | .................. | H04L 9/0819 |
| 2025/0322710 A1 * | 10/2025 | Wright | ................ | G07F 17/3213 |

OTHER PUBLICATIONS

Kousalya, C. Gnana; Dr. Raja, J. A Traffic-Aware Key Management (TKM) Scheme for Wireless Sensor Networks. 2009 IEEE International Advance Computing Conference. https://ieeexplore.ieee.org/stamp/stamp.jsp?tp=&arnumber=4809107 (Year: 2009).*

Wang, Fei et al. Distributed Hierarchical Key Management Scheme in Mobile Ad Hoc Networks. GLOBECOM 2009—2009 IEEE Global Telecommunications Conference. https://ieeexplore.ieee.org/stamp/stamp.jsp?tp=&arnumber=5425924 (Year: 2010).*

Oli, S. Arul; Dr. Arockiam, L. A framework for key management for data confidentiality in cloud environment. 2015 International Conference on Computer Communication and Informatics (ICCCI). https://ieeexplore.ieee.org/stamp/stamp.jsp?tp=&arnumber=7218116 (Year: 2015).*

Ma, Mingxin et al. Hierarchical Key Management Scheme with Multilevel Secure Access. 2019 International Conference on Cyber-Enabled Distributed Computing and Knowledge Discovery (CyberC). https://ieeexplore.ieee.org/stamp/stamp.jsp?tp=& arnumber=8945831 (Year: 2019).*

* cited by examiner

*Primary Examiner* — Jeremiah L Avery
(74) *Attorney, Agent, or Firm* — Kilpatrick Townsend & Stockton LLP

(57) ABSTRACT

Example methods and systems for generation and verification of dynamically adapted unique keys in scenarios involving soft deletion are provided. In an example method, a data store is accessed and a request to designate an attribute of data in the data store as a unique key is received. In response to the request, a status value associated with each record of a subset of the data is generated, wherein the status value comprises a non-conflicting number or string. The attribute and its associated status are updated as the unique key.

20 Claims, 8 Drawing Sheets

300

KEY MANAGEMENT SYSTEM 310

SERVERS 311

UNIQUE KEY GENERATION SUBSYSTEM 313

UNIQUE KEY STORAGE SUBSYSTEM 315

UNIQUE KEY VERIFICATION SUBSYSTEM 317

NETWORK 320

CLIENT DEVICE 330A

CLIENT DEVICE 330B

CLIENT DEVICE 330N

501

| id | name | name1 | status | |
|----|------|-------|--------|---|
| 1 | a | a | 1 | 502 |
| 2 | b | a | 1 | 504 |
| 3 | c | b | 1 | 506 |
| 4 | d | b | 1 | 508 |
| 5 | e | b | 1 | 510 |
| 6 | f | b | 1 | 512 |

501 composite unique key

| id | name | name1 | status | |
|----|------|-------|--------|---|
| 1 | a | a | 1 | 502 |
| 2 | b | a | 2 | 514 |
| 3 | c | b | 1 | 506 |
| 4 | d | b | 2 | 516 |
| 5 | e | b | 3 | 518 |
| 6 | f | b | 4 | 520 |

501

| id | name | name1 | status | |
|----|------|-------|--------|---|
| 1 | a | a | 342732009 | 522 |
| 2 | b | a | 293478827 | 524 |
| 3 | c | b | 190745982 | 526 |
| 4 | d | b | 223829460 | 528 |
| 5 | e | b | 323847298 | 530 |
| 6 | f | b | 423487487 | 532 |

700

702

ACCESS A DATA STORE

704

RECEIVE A REQUEST TO DESIGNATE AN ATTRIBUTE OF DATA STORED IN THE DATA STORE AS A UNIQUE KEY

706

GENERATE A STATUS VALUE ASSOCIATED WITH EACH RECORD OF A SUBSET OF DATA

708

UPDATE A COMBINATION OF THE ATTRIBUTE AND THE STATUS AS THE UNIQUE KEY

SEQUENTIAL OR IN PARALLEL

710

SEND A RESPONSE OR TRIGGER A NOTIFICATION

DYNAMICALLY ADAPTED UNIQUE KEY GENERATION AND VERIFICATION

FIELD

The present application generally relates to unique key generation and verification, and more specifically, relates to generation and verification of dynamically adapted unique keys in scenarios involving soft deletion.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
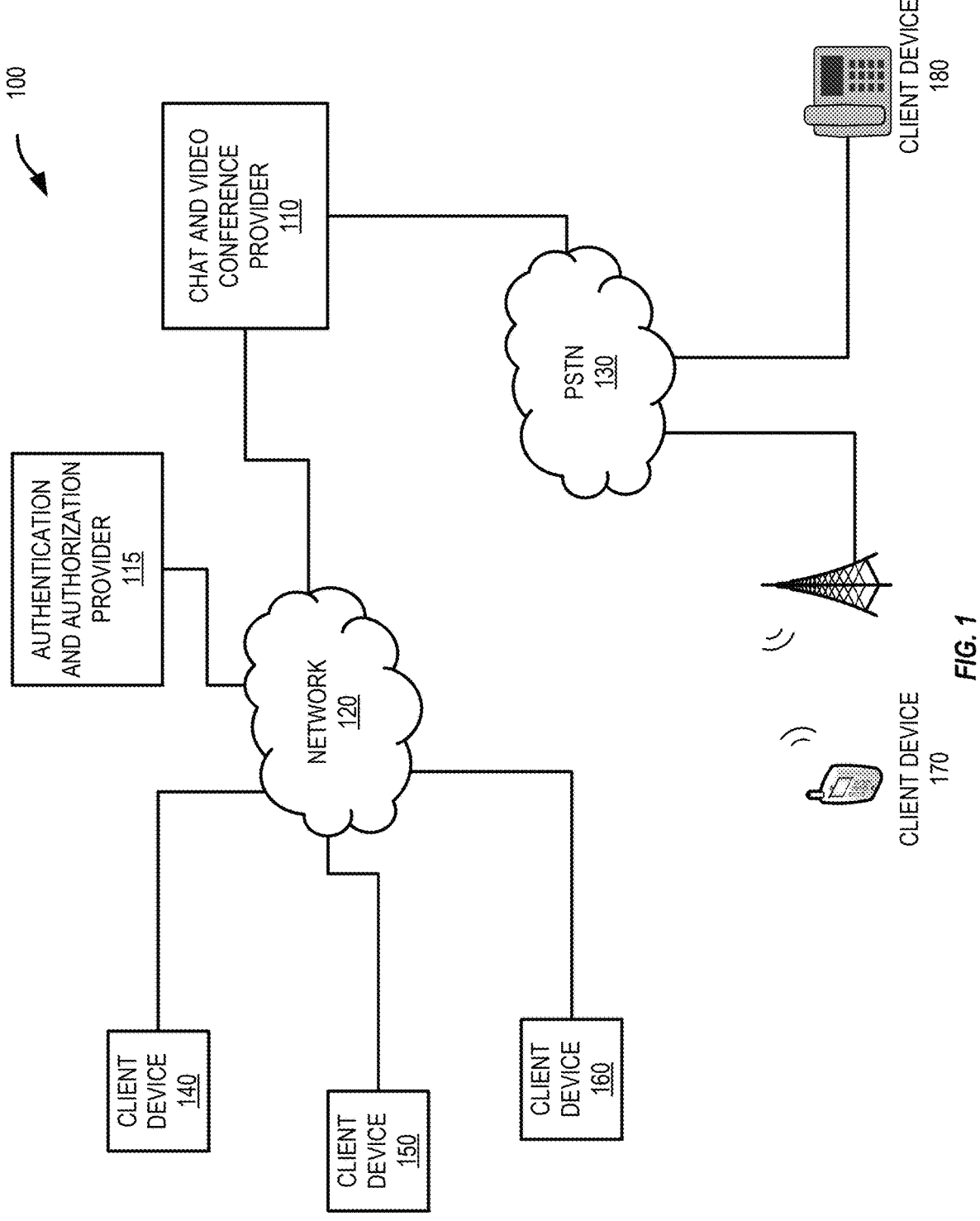
FIG. 1 shows an example system that provides videoconferencing and chat functionality to various client devices.

Examples are described herein in the context of synergistic automatic speech recognition and accent conversion for in real-time conversations. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Unique keys are fundamental components in computing technologies, encompassing crucial areas such as data management, data security, and cryptography. The primary function of unique keys is to preserve the integrity of data stored within a dataset. By enforcing this uniqueness constraint, unique keys ensure that no two records within the dataset share identical values for a specified attribute, thus ensuring that each record is distinct from every other record and can be individually identified by its unique key. This also helps with safeguarding against data duplication and maintaining data accuracy. In encryption and decryption procedures, unique keys are utilized to securely encode and decode sensitive information, ensuring confidentiality and privacy. In authentication mechanisms, unique keys serve as authentication tokens, verifying the identity of users or entities and granting access only to authorized parties. In data management systems, they frequently act as primary identifiers for records within databases, providing a unique reference point for each entry, which facilitates efficient retrieval, updating, and management of data, enabling swift and accurate data manipulation operations.

While unique keys are instrumental in ensuring the distinctiveness of each record within a dataset, the management and enforcement of uniqueness constraints across large and intricate datasets can pose significant challenges. One notable challenge related to unique keys emerges in scenarios involving soft deletion. Instead of the traditional hard deletion method, which removes records permanently from the database or memory, soft deletion only marks records as "deleted" or "inactive" without actually erasing them from the database or memory. In most cases, a flag, typically a boolean field (e.g., 0 or 1), is set to indicate that the record is considered deleted (e.g., 1). This approach allows the data to be easily recovered or restored if necessary, and it maintains the integrity of the database by preserving the historical data.

However, in some instances, a record may undergo soft deletion, but its associated status or flag may remain improperly invalidated or unaltered, resulting in erroneously retaining an active status of the record in the system, potentially leading to conflicts or inconsistencies. Such issues may arise during attempts to insert a new record with the same unique key or when querying the database or memory for unique key constraints. Another obstacle arises during data restoration or recovery procedures. If soft-deleted records necessitate restoration, conflicts may emerge if the unique key used in the restored data record had already been reassigned or reused in the interim. This could result in data duplication or breaches of data integrity if not managed effectively. Moreover, transitioning attributes of records already stored in the database or memory to unique ones can be laborious and resource-intensive, demanding considerable time and computing resources for verification.

To address the challenges and problems associated with unique keys generating and verification, especially in soft deletion scenarios, techniques disclosed herein are directed to dynamically adapting status values associated with unique keys and generating composite unique keys. Specifically, the techniques involve accessing data stored in a database or a memory, receiving a request from a user to designate an attribute of the data as a unique key, randomly generating non-conflicting status values associated with each entry within the attribute, and updating the attribute along with the status to form a composite unique key.

The non-conflicting status values may be random numerical values or strings. The generating of the status values may be made based on timestamps associated with the generation. For example, the status values may correspond to the system clock, e.g., the current time in seconds since a predetermined epoch (e.g., Jan. 1, 1970, 00:00:00 UTC), down to milliseconds or microseconds, depending on the precision supported by the system. The generating of the status values may also be made based on other approaches such as a hash-based approach, an auto-increment approach, a random number generator approach, an external system approach, a custom-designed algorithm approach, or any of the combination thereof. In some instances, the numerical values may be converted to a string format for easier manipulation and concatenation with other elements or entries in another attribute.

The disclosed techniques can also be used for unique key generation and data verification under multiple requests. For example, when receiving multiple requests from a user to designate multiple attributes of the data as unique keys, a set of non-conflicting status values may be used generated for each designated attribute as a unique key. In some instances, the same set of non-conflicting status values may be used as the unique key for each designated attribute. The disclosed techniques can offer computational benefits, such as reduced computing time and memory requirements, when adding or removing records from datasets containing multiple unique keys.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
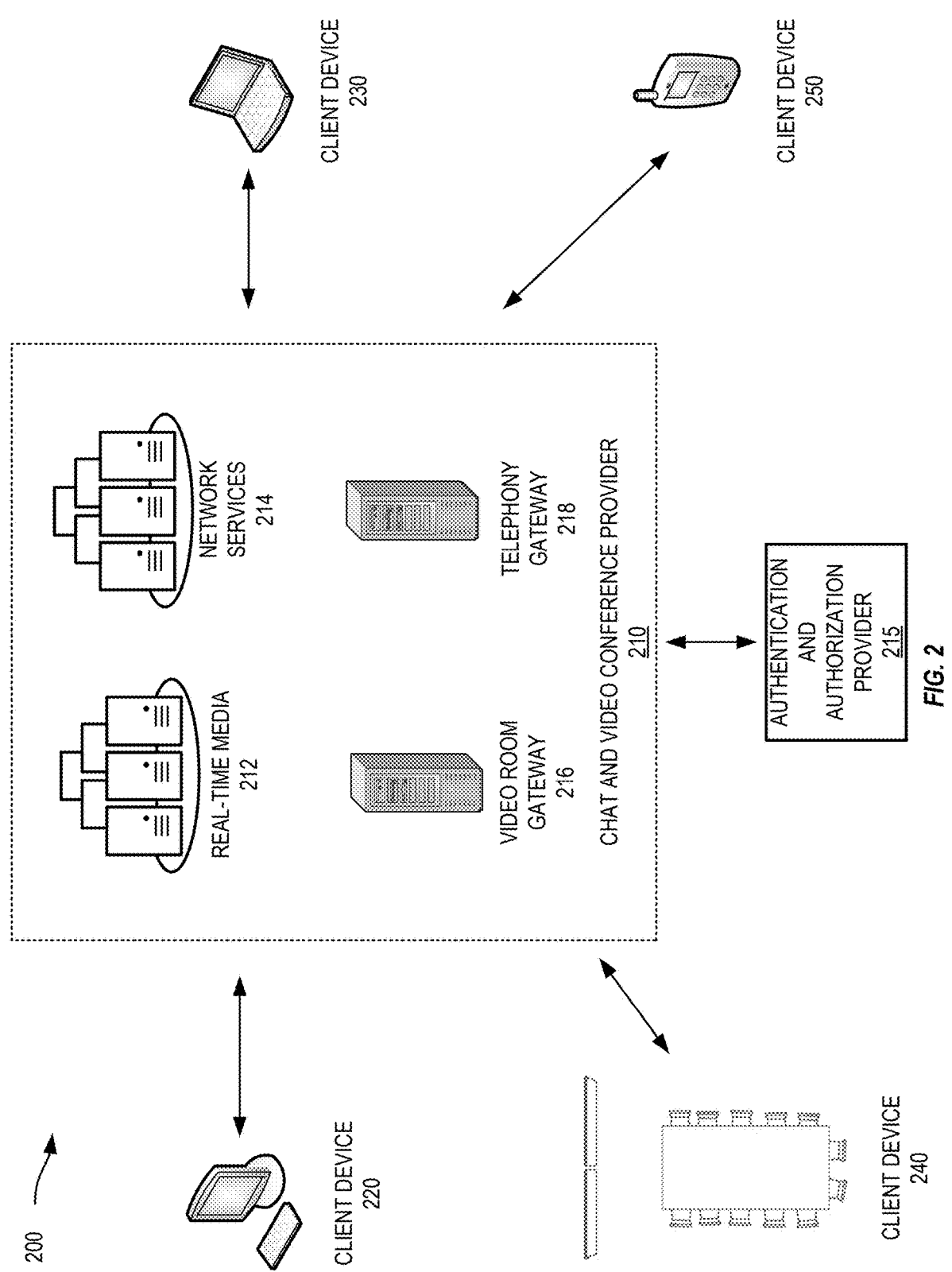
FIG. 2 shows an example system in which a chat and video conference provider provides videoconferencing and chat functionality to various client device.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real-time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
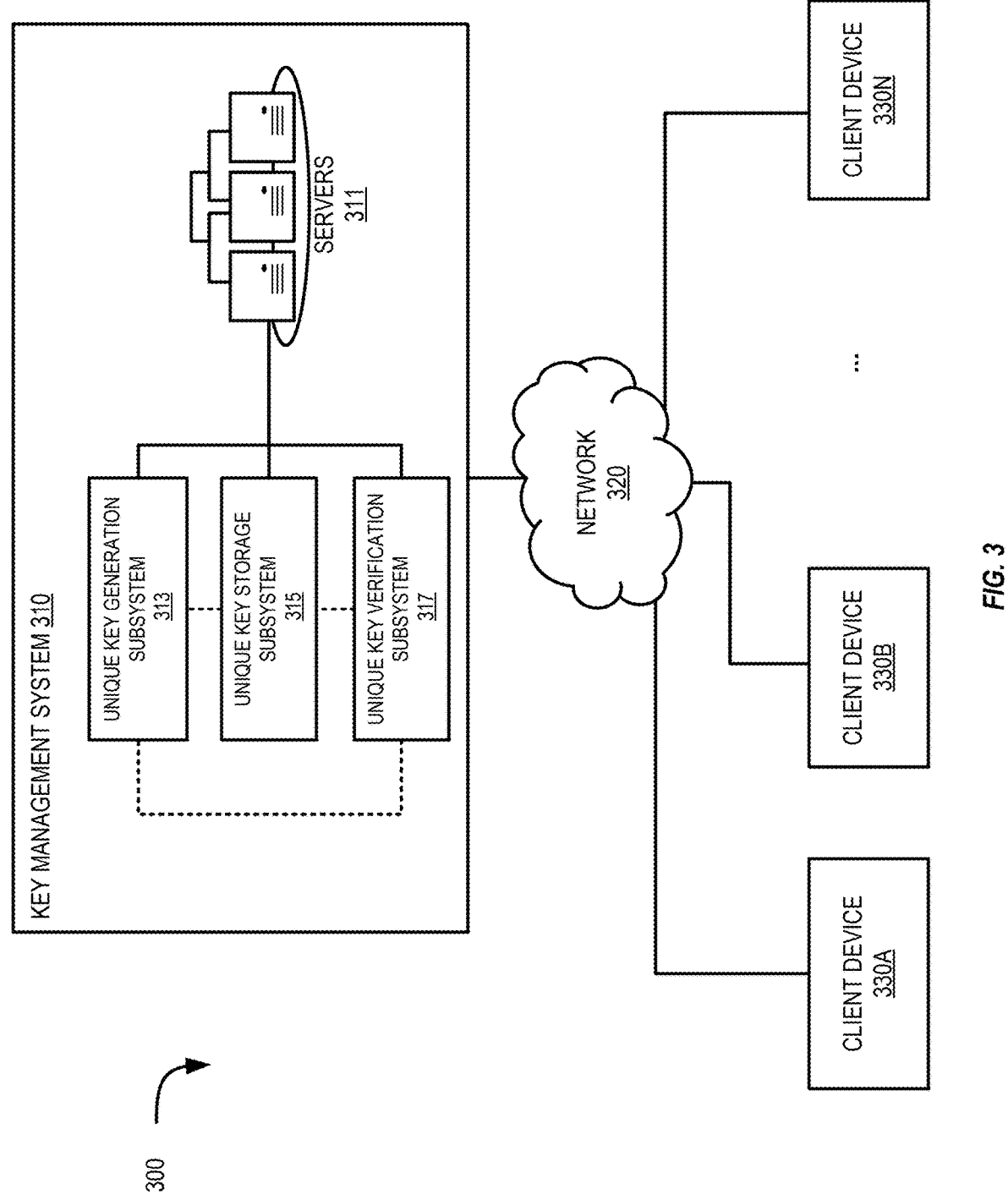
FIG. 3 shows an example system that supports the generation and verification of dynamically adapted unique keys.
Figure 6:
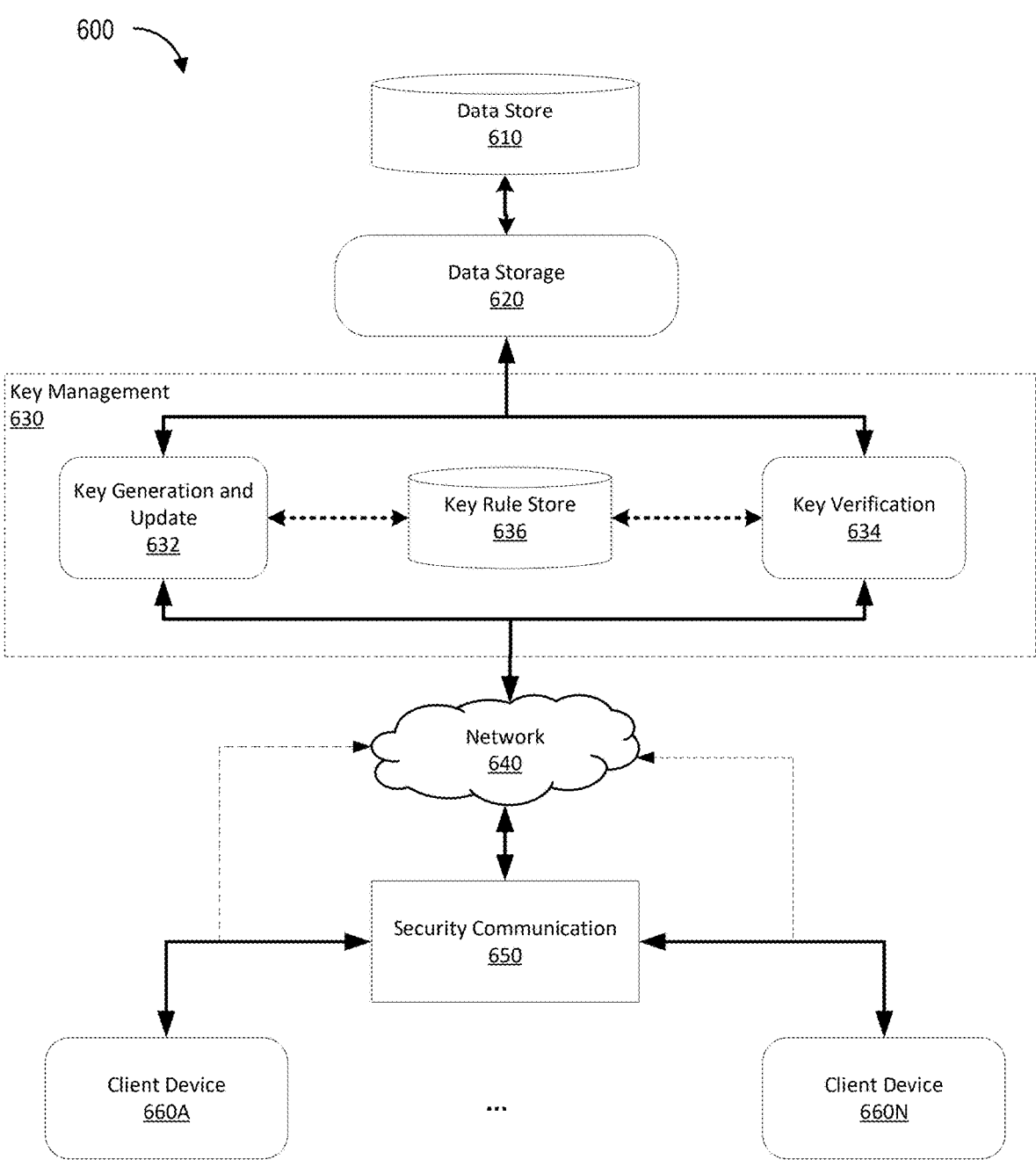
FIG. 6 shows an example logical structure of a key management system that supports the generation and verification of dynamically adapted unique keys.

Referring now to FIG. 3, FIG. 3 shows an example system 300 that that supports the generation and verification of dynamically adapted unique keys. In this example system 300, a key management system 310 and a number of client devices 330A-330N (which may be referred to herein individually as a client device 330 or collectively as the client devices 330) are connected via a network 320. The key management system 310 may have a logical structure, or a portion of it, as shown in FIG. 6.

As shown in FIG. 3, the key management system 310 contains a number of servers 311, a unique key generation subsystem 313, a unique key storage subsystem 315, and a unique key verification subsystem 317. The servers 311 may be the one or more servers employed by the video conference provider 210 in FIG. 2. The unique key generation subsystem 313, the unique key storage subsystem 315, and the unique key verification subsystem 317 may be interactive and deployed to perform the generation and verification of dynamically adapted unique keys. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 330 can be any suitable computing or communications device. The client device 330 can be a client device (e.g., 140, 150, 160, or 170) in FIG. 1 or a client device (e.g., 220, 230, or 250) in FIG. 2. For example, client devices 330 may be desktop computers, laptop computers, tablets, smart phones having processors and computer-readable media, connected to the key management system 310 using the internet or other suitable computer network. The client devices 330 have communication software installed to enable them to connect to the key management system 310 for sending requests to generate, designate, store, or verify keys, performing data management functions, performing communication functions, and/or performing any other suitable functions. For example, a user associated a client device (e.g., client device 330A) can send a request to the key management system 310 to generate a unique key associated with each record stored in a database, and/or verify if a key satisfies a uniqueness requirement. In some instances, a user associated a client device (e.g., client device 330A) may also send a request to add or delete records stored in a database, which may trigger an auto-generation and/or auto-verification of a unique key associated with the records using the key management system 310.

Figure 4:
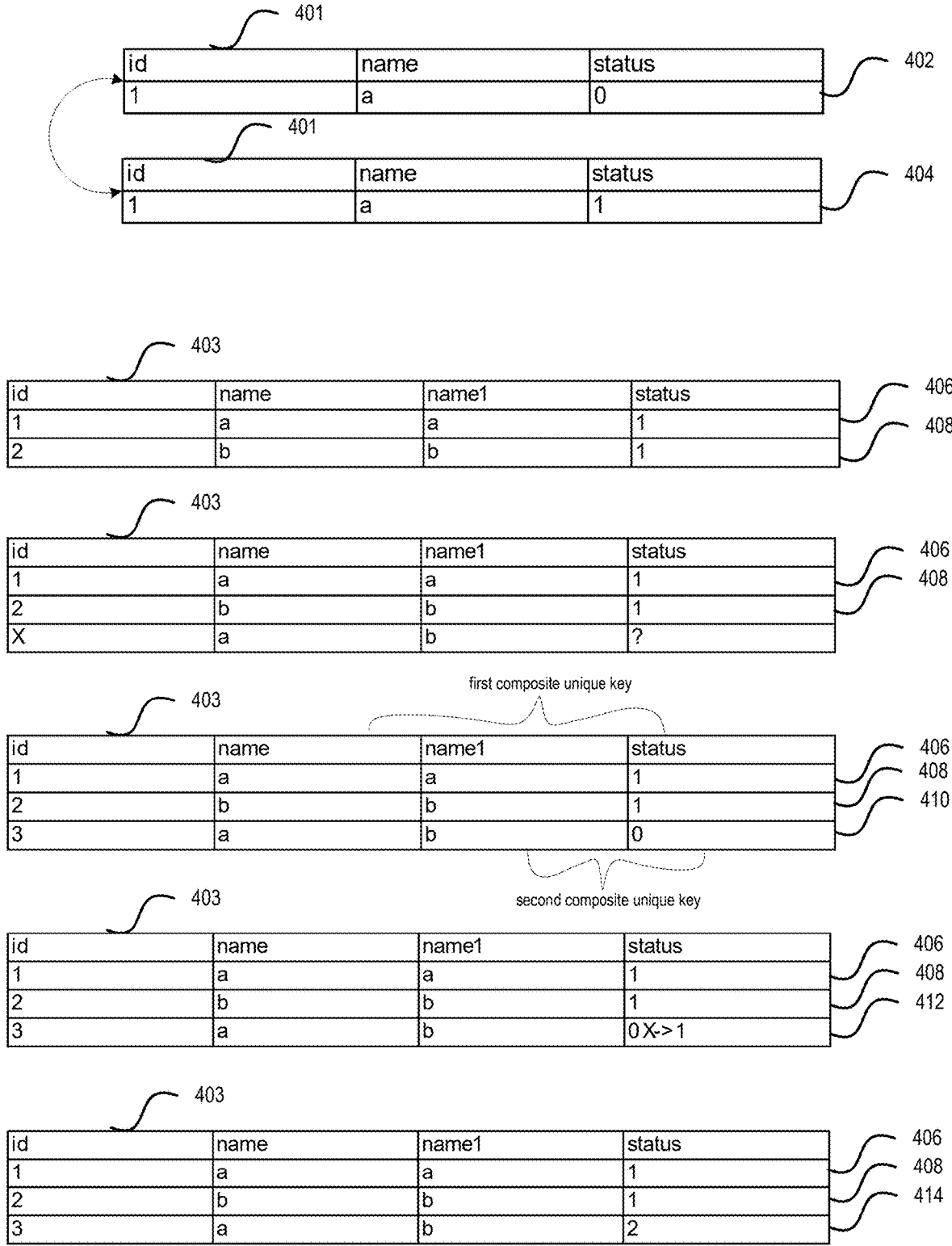
FIG. 4 shows example tables and records with unique keys stored in a database or a database management system.

Referring now to FIG. 4, FIG. 4 shows example tables 401 and 403 and records 402, 404-414 with unique keys stored in a database or a database management system. For example, a record may be an entry or a row in a table stored in a database using MySQL, which is a relational database management system (RDBMS) that uses Structured Query Language (SQL) for managing and manipulating databases and database records. The record or the table is stored in the appropriate storage engine format. For example, the record may be stored in memory (e.g., RAM), as a computer file (e.g., a comma-separated values (CSV) file), or in a tablespace. The record usually has more than one attributes, and may also has an identifier (e.g., ID or index), which can be considered as one of the attributes and may serve as a primary key. A user may send a request to MySQL to generate a database, a table in a database, as well as defining attributes in the table. For example, a user may send a request to MySQL to generate an employee table with attributes including ID, first name, last name, date of birth, gender, email, job title, department identifier, address, and hire date. It should be understood that that MySQL is used as an exemplary database management system, and other database management systems (e.g., PostgreSQL, NoSQL, Firebird, commercial database management system such as Oracle Database, Azure SQL Database, and IBM Db2, or the like) or databases may be used to manage, organize, and/or store data such as records with unique keys.

Not all values corresponding to each attribute need to be unique. For example, two different employees may have the same first name, last name, date of birth, gender, and etc. However, values corresponding to ID or email are usually expected to be unique, so that each employee can be uniquely identified. The unique keys also help maintain data integrity, ensuring that data remains accurate, consistent, and unaltered during operations such as storage, retrieval, transfer, and processing.

Sometimes when an employee leaves their employer, the record associated with the employee may be deleted to maintain data integrity and reduce storage costs. Although the record can be permanently deleted (e.g., hard delete) from the database where the record is stored, in some instances, hard deletion is not the best choice, since the deletion cannot be recovered. For example, for an easy tracking or auditing of deleted records, soft deletion may be a better choice. While soft deletion does not immediately free up storage, it allows for more controlled and planned data purging processes. This can be particularly useful in managing large datasets. Additionally, soft-deleted records can be archived or moved to slower, cheaper storage solutions, optimizing the use of more expensive, high-performance storage systems. In some instances, soft deletion can help businesses quickly respond to legal inquiries and audits, potentially reducing legal costs and risks.

As previously disclosed, soft deletion involves marking records as "deleted" without physically removing them from the database. This approach typically involves setting a flag or status indicator within the record to denote its deletion status. Unlike hard deletion, where data is permanently removed, soft deletion allows for the retention of records for future recovery, auditing, or historical analysis. This method is particularly beneficial in legal, corporate, and data-intensive environments where data integrity, compliance with regulatory requirements, and operational flexibility are paramount. By leveraging soft deletion, organizations can ensure that data is not prematurely lost, maintain comprehensive audit trails, and optimize their data management practices supporting business needs and legal obligations.

Implementing soft deletion, while advantageous for data recovery and compliance, presents several challenges. One significant difficulty is when the soft deletion is implemented in a database storing records with unique keys. Since unique constraints typically enforce the uniqueness of a field (e.g., an attribute) or combination of fields, soft-deleted records can conflict with new records if the unique key values are reused. This necessitates additional logic to handle unique key constraints. In some instances, the problem can be resolved by appending a unique identifier to the soft-deleted records' key fields or adjusting the uniqueness checks to exclude soft-deleted entries. These workarounds can complicate the database schema and application logic, potentially leading to increased development and maintenance overhead, including increasing memory storage demand and costs. Moreover, ensuring data integrity and preventing unique key violations requires meticulous attention to the handling of soft-deleted records during data operations, adding another layer of complexity to database management.

As shown in FIG. 4, a record 402 stored in a table 401 of a database has three attributes including "id," "name," and "status." In some instances, the "id" refers to a primary key or a unique identifier assigned to the record in the table, ensuring that every entry in the table can be individually accessed, updated, or deleted without ambiguity. In some instances, the "name" can be assigned as a unique key. The "status" may be a flag representing whether the record is valid or has been soft-deleted. For example, when the status is 0 for the record 402, the record 402 is a valid record and can be retrieved, searched, or queried through proper or authorized requests.

To soft-delete the record 402 from the table 401, the status of the record can be changed to 1, representing that the record associated with id=1 is no longer a valid record, shown as the record 404 in FIG. 4. When a user or a system decides to add back the soft-deleted record 404, or generate a new record with name=a, the record 404 can be reused by changing status=1 in the record 404 to status=0 so that the record with name=a can be queried or verified. Manipulating the status can avoid generating redundant data in the table 401, such as by creating a new record for the same employee after they re-join a company or using additional computer memory to store the extra record, therefore save the computational costs.

However, a change of status may only be suitable when there is only one unique attribute (except for the primary key) in the record. The strategy may not achieve the desired results when there are at least two unique attributes. For example, a table 403 includes records 406 and 408 with two unique attributes: "name" and "name 1." Record 406 is a soft-deleted record having name=a and name1=a. Record 408 is another soft-deleted record having name=b and name1=b. During a unique key verification process (e.g., performed using the unique key verification subsystem 317 as shown in FIG. 3), the table 403 is a valid table without conflicts since each value stored corresponding to the "name" attribute is unique and each value stored corresponding to the "name1" attribute is also unique.

A problem arises when attempting to add a record with name=a and name1=b. This record cannot be added to the table 403 because the unique key verification process will return an error. Adding the record would result in conflicts, as there would be two entries with "a" under the unique attribute "name" and two entries with "b" under the unique attribute "name1."

A possible solution to the problem is to use composite unique keys. For example, in response to a user request to set "name" and "name1" as unique keys, the key management system may set "name"+"status" as a first composite unique key and set "name1"+"status" as a second composite unique key. When the key management system has updated the uniqueness rules for the table 403, a valid record 410 can be added and stored, with id=3, name=a, name1=b, and status=0.

A new problem arises when attempting to soft-delete the record 410 from the table 403. As shown in FIG. 4, when trying to update the record 410 by changing the status value from 0 to 1, the record 412 cannot be stored in the table or data set, as the unique key verification process will return an error. If the status value is set as 1 for the record 410, the first composite unique key would have two "name=a"+"status=1" values, which conflicts with the uniqueness rule. Similarly, if the status value is set as 1 for the record 410, the second composite unique key would have two "name1=b"+ "status=1" values, which also conflicts with the uniqueness rule.

A possible solution to the new problem is to change the status value rule for the table 403. For example, instead of setting a status value corresponding to an inactive or soft-deleted record as a constant "1," the status value rule may decide to accumulate the status value when a possible conflict occurs. For example, if the key management system detects that the soft deletion of the record 412 may result in a conflict with a unique key for an existing record 406 or 408, the status value corresponding to the record 412 is changed to "2," an accumulated value corresponding to the status value in the record 406 or 408. As shown in FIG. 4, the record 414 can pass the unique key verification process and every record stored in the table 403 (including the records 406, 408, and 414) does not violate the uniqueness rule. Thus, because the status is non-zero, it is treated as being soft-deleted by the DMBS.

Figure 5:
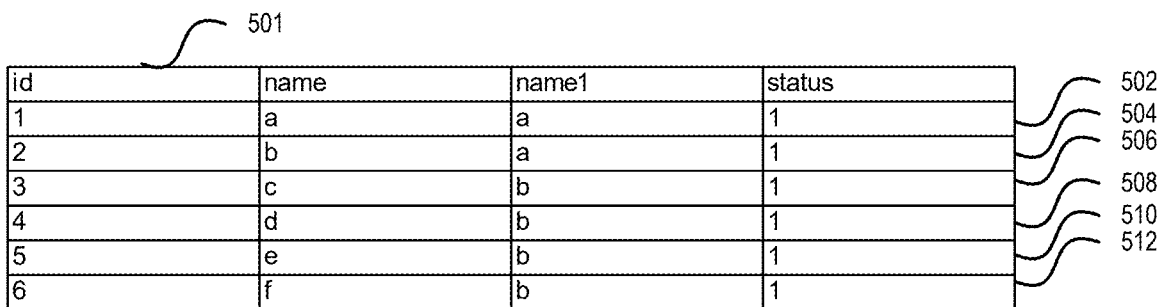
FIG. 5 shows example tables and records with unique keys stored in a database or a database management system.
Figure 5:
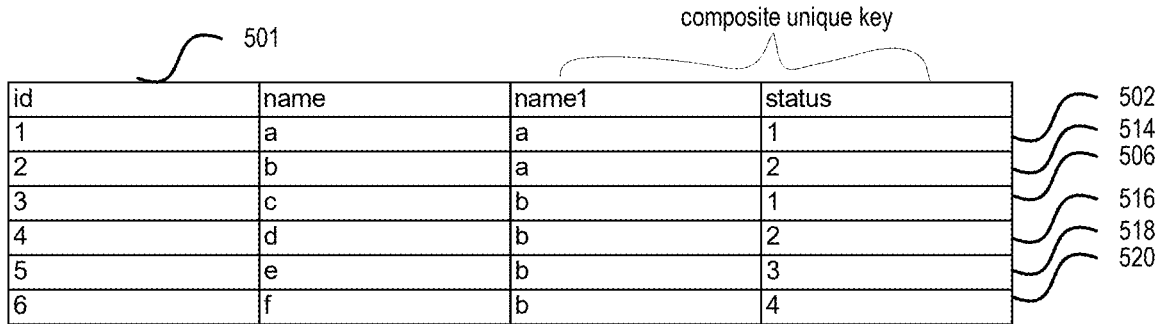

Referring now to FIG. 5, FIG. 5 shows example table 501 and records 502-532 with unique keys stored in a database or a database management system. In the table 501 with the records 502, 504, 506, 508, 510, and 512, the "id" attribute may be set as the primary unique key, and the "name" attribute may be set as another unique key, and the "name1" is not a unique key. Each record in the table 501 has a status value=1, indicating that the records are all invalid, or have been soft deleted.

However, under certain scenarios, demand for the uniqueness with regard to different attributes in a table may be changed. For example, in response to a request, the "name1" attribute may be dynamically set as another unique key. A new problem arises since "name1" contains values that are not unique. In the table 501, there are two "a"s and four "b"s, which conflicts with the uniqueness rule.

A possible solution to the new problem can be similar to the problem regarding the table 403 described with respect to FIG. 4. That is, the "name1"+"status" attribute is set as a composite unique key, with an update of the status value stored in the table 501. For example, an algorithm is used to traverse the "name1" attribute for all the records stored in the table 501, e.g., using the key management system 310, described with regard to FIG. 3. The record 502 is the first record in the table 501 and will not conflict with an existing record (because there is no existing record). When the algorithm traverses with regard to the record 504, a conflict would be found, since both the record 502 and the record 504 has the same name1 value under the "name1" attribute. In such instance, the record 504 is updated to the record 514 by changing the status value from "1" to "2," using an accumulation rule. Similarly, records 506-512 are traversed and the record 508 is updated to the record 516 by changing the status value from "1" to "2," the record 510 is updated to the record 518 by changing the status value from "1" to "3," and the record 512 is updated to the record 520 by changing the status value from "1" to "4."

A problem associated with the above solution is that it would result in a significant performance loss, for example, to the servers 311 of the key management system 310, described with regard to FIG. 3. The problem is triggered by the needs that the servers 311 have to traverse all the values stored under the attribute that is dynamically designated as a unique key and accumulate the status of conflicting data. The performance loss is also affected by the size of the table. The larger the table, the more data the servers have to traverse, resulting in greater performance loss.

A solution to this significant performance loss problem is to use non-conflicting random numbers or strings as values in the "status" attribute. Instead of adopting the accumulation rule to set the status value, techniques disclosed herein include the use of non-conflicting random numbers or strings as status values and the combination of the "status" attribute and the designated unique attribute (e.g., the "name1" attribute in the table 501) as a composite unique key. Comparing with using the accumulation rule to generate or update status values in a table, as illustrated above, the techniques of using non-conflicting random numbers or to generate or update status values in the table without the significant performance loss. The techniques also improve the computer system.

In some instances, non-conflicting random numbers as status values for records in a table can be generated, as discussed in more detail with respect to FIG. 6, when the records are added and stored in the table. In some instances, the non-conflicting random numbers may be used to update the existing status value stored in the table. For example, when a request is sent to dynamically set the "name1" attribute as a unique key in the table 501 with records 502-512, records with the status value=1 can be updated to records 522-532, with each record having a unique, non-conflicting value as its status value. As shown in FIG. 5, the status value=1 in the record 502 is updated to the status value=342732009 in the record 522. In some instances, the table 501 with records 522-532 has status values generated as non-conflicting random numbers when the table 501 is initially generated or stored in a database.

Comparing with using the accumulation rule to generate or update status values in the table 501 with records 502-512 or with records 502, 514, 506, 516, 618, and 520, the non-conflicting random number approach does not traverse the entire table 501. The computational complexity associated with the non-conflicting random number approach for generating or updating the status values is $O(1)$ or $O(n)$, denoting that the running time of the approach increases, in the worst scenario, linearly with the increase in table size. In contrast, the computational complexity associated with the accumulation approach for generating or updating the status values is usually $O(n^2)$ or at least $O(nlogn)$, denoting that the running time of the approach can increases quadratically with the increase in table size.

The non-conflicting random number approach also advances the accumulation approach when multiple attributes are designated as unique keys. In the accumulation approach, the table has to be traversed multiple times to update the status corresponding to each record. For example, if the "name" and "name1" attributes in the table 501 with records 502-512 are not set unique keys originally, but are dynamically assigned as unique keys, the table 501 needs to be traverse first to see if there is any conflict regarding using "name"+"status" as a unique composite key. Then the table 501 needs to be traverse again to see if there is any conflict regarding using "name1"+"status" as a unique composite key. In contrast, once the status values are generated using the non-conflicting random number approach, the table 501 does not have to be traversed.

The techniques improve the performance regarding processing speed and efficiency, as well as reducing the power consumption of the computer hardware components such as CPUs, GPUs, memory, or other storage devices. The techniques also improve network protocols that enhance data processing speed, reliability, integrity, and security with minimal possible conflicts. Additionally, the techniques improve the database management system that enhance data retrieval speed, storage efficiency, and query processing capabilities.

Referring now to FIG. 6, FIG. 6 shows an example logical structure 600 of a key management system that supports the generation and verification of dynamically adapted unique keys. As shown in FIG. 6, the example logical structure 600 has a data store 610, a data storage module 620, a key management module 630, a network 640, a security communication module 650, and client devices 660A-N (which may be referred to herein individually as a client device 660 or collectively as the client devices 660). The components, elements, and modules in the example logical structure 600 can act interactively to support the generation and verification of dynamically adapted unique keys.

A request may be sent to the network 640 to dynamically designate one specific attribute of a table as a unique key. The request may also be a request to dynamically designate multiple attributes of the table as unique keys. In some instances, the request is initiated from a client device 660. The request may also be initiated automatically by one or more components in the logical structure 600 based on a rule stored in the structure. The request may be encrypted by the security communication module 650 to ensure secure communication between the network 640 and the client device 660. In some instances, an encryption key or rule is stored and managed by the key management module 630 to encrypt the request. The request or encrypted request is transmitted over the network 640 to the key management module 630. There may be three components in the key management module 630, a key generation and update component 632, a key verification component 634, and a key rule store 636, as shown in FIG. 6. The key generation and update component 632 is responsible for generating new keys and updating existing keys; the key verification component 634 is responsible for verifying the validity and integrity of the keys being used; and the key rule store 636 manages the rules and policies regarding key usage, generation, and verification.

When the request or encrypted request to dynamically designate one or more specific attributes of the table as unique keys is received by the key management module 630, the key management module 630 may first query the data store 610 through the data storage module 620. The key management module 630 may verify that the table is stored in the data store 610 with the one or more specific attributes. The verification may be performed by the key verification component 634 or a different verification component that is not shown in FIG. 6. The verification may also include a verification of the validity of the encryption key used in the request. If the table with the one or more specific attributes is verified to be not stored in the data store 610, a notification may be sent to the client device 660 through the network 640. The notification may indicate that the table is not in existence, or the one or more specific attributes are not attributes in the table. If the encryption key is invalid, a notification may be sent to the client device 660 through the network 640 that the client device or the user using the client device does not have access to the data store 610. A notification may also be sent to the security communication module to alert that a request has been made without authorization.

After verifying that the table with the one or more specific attributes is stored in the data store 610 and/or the request has been correctly encrypted, the table being queried may be sent securely to the data storage module 620 for further processing, or loaded in memory (e.g., RAM or cache memory) for processing. In some instances, only the relevant portion of the table (e.g., records that are marked as inactive, invalid, or soft-deleted) is being sent or loaded for processing. In some instances, it is preferable to load data into memory for processing. The in-memory processing not only ensures faster processing speed, but also allows for potential rollback in case of an error or a need to abort the operations performed during the processing. In some instances, the memory may be set as an additional component in the logical structure 600 or associated with the key management module 630.

The processing operations are provided by the key management module 630. After the table or a portion thereof is loaded into the memory (in some instances, simultaneously with the loading), a status value is generated associated with each record in the table or the portion thereof by the key generation and update component 632. Each status value is a number or a string of characters that does not conflict with any other status value in the table. In some instances, the status values are generated using a random number generator and/or a set of key rules that ensure the generated status values are non-conflicting. For example, the status values are generated based on (i) a timestamp-based approach, (ii) a hash-based approach, (iii) an auto-increment approach, (iv) a random number generator approach, (v) an external system approach, and (vi) a custom-designed algorithm approach.

In the timestamp-based approach, the time (e.g., date and time) to generate the status value or access to the specific record corresponding to the status value is used as the status value. For example, status value=20230702123456 is generated for a record accessed on Jul. 2, 2023 at 12:34:56 PM. In some instances, the status values may correspond to a system clock, e.g., the current time in seconds since a predetermined epoch (e.g., Jan. 1, 1970, 00:00:00 UTC), down to milliseconds or microseconds, depending on the precision supported by the key management module 630. In some instances, to ensure that a non-conflicting number is generated using the timestamp-based approach, a minimum time interval between successive data additions is identified or obtained, so that the status value generated using the timestamp-based approach has a resolution equal to or finer than the minimum time interval. Alternatively, an expected fastest rate at which data will be added is identified or obtained. For example, if data can be added every microsecond, this timestamp-based approach will have a timestamp resolution of at least one microsecond. In some instances, the timestamp resolution, the minimum time interval, or the expected fastest rate is identified using the key management module 630.

The timestamp-based approach ensures uniqueness at a given moment, as no two timestamps are the same. Additionally, the timestamp-based approach ensures the status value is naturally ordered and may be useful for sorting and querying data chronologically. However, in a high-throughput system, multiple operations may be performed at a speed that is faster than the timestamp resolution supported by the system, and collision may happen. In such scenario, another approach (e.g., a random number generator approach) may be used in combination with the timestamp-based approach. For example, the status value may be set as a 19-digit number, with the last three digits being generated as a random number. In some instances, a value associated with an existing unique key is combined with or concatenated to the value generated using the timestamp-based approach to determine the status value.

In the hash-based approach, the status values are generated using a cryptographic hash function or algorithm (e.g., Secure Hash Algorithm 256-bit (SHA-256)). The cryptographic hash function typically generates a fixed-size hash value based on input data. For example, SHA-256 produces a 256-bit hash value, represented as a 64-character hexadecimal string. In some instances, the input data is a combination or concatenation of multiple attributes in the table. For example, SHA-256 may generate a 256-bit hash value by hashing a combination of the "name" attribute, the "name1" attribute, and a timestamp. The probability of generating the same number based on different input values using SHA-256 is astronomically low, effectively ensuring unique hash values for different inputs in almost all practical scenarios. For example, if one million ($10^6$) status values are to be generated based on SHA-256, the probability of collision is $4.32 \times 10^{-66}$. If one trillion ($10^{12}$) status values are to be generated using SHA-256, the probability of collision is $4.32 \times 10^{-54}$. The probability of generating the same number using SHA-256, even with a large number of inputs, is so low that it is considered negligible. Compared with the timestamp-based approach, the hash-based approach generates status values that are harder to predict and tamper with, which can be used in security-sensitive scenarios. Similar to the timestamp-based approach, in some instances, another approach (e.g., a random number generator approach) may be used in combination with the hash-based approach to decrease the probability of collisions. In some instances, a value associated with an existing unique key is combined with or concatenated to the value generated using the hash-based approach to determine the status value. It should be understood that any of the approaches described herein can be used in combination to ensure that a collision is highly unlikely to occur.

In the auto-increment approach, a database feature can be used that automatically generates a unique key each time a new record is added into the table. When the new record is added, the database increments the previous highest value by a predetermined number (e.g., one) and assigns this new value as the status value for the new record. This approach can be simple implemented and ensure that each status value is unique within the table, providing a straightforward and efficient way to maintain uniqueness without the need for additional logic or overhead. It may pose challenges in systems where multiple nodes attempt to generate keys simultaneously, requiring synchronization mechanisms to avoid conflicts.

In the random number generator approach, unique keys are generated using a random number generator (RNG) or by using a random number generation algorithm. This approach leverages functions or RNGs that produce sequences of numbers or strings of characters that without a discernible pattern, ensuring that each generated key is unique with a high probability. For example, the probability of generating repeat values (conflicts or collisions) when using a 128-bit range is approximately $1.47 \times 10^{-27}$ to $1.47 \times 10^{-15}$, for an output size of one million to one trillion. The approach may be ideal for scenarios where security and non-sequential identifiers are important, as it creates unpredictable keys. By ensuring a sufficiently large range for the random values, the likelihood of duplicates is minimized, making this approach effective for generating unique status values.

In the external system approach, unique keys are delegated by an external service or system. This external service or system is specifically designed to produce unique identifiers and can handle requests from multiple clients or systems, ensuring that the generated keys are globally unique. By offloading key generation to the external service or system, the key management module 630 reduces complexity and avoids collision risks.

In the custom-designed algorithm approach, unique keys are generated using a tailored algorithm specifically designed to meet the uniqueness requirements based on the request or the management module 630. This approach allows for flexibility in combining various elements such as timestamps, machine identifiers, algorithms, and random components to ensure uniqueness, avoid collisions, and meet specific performance and security needs.

Rules associated with each of the above approaches may be stored in the key rule store 636 and accessible by the key generation and update component 632 and the key verification component 634. In some instances, after the status values are generated by the key generation and update component 632, the values are verified by the key verification component 634 to ensure there is no conflict or collision. If a collision is found by the key verification component 634, a same rule or approach, or a new rule or a different approach may be selected to regenerate the status values until the values are unique. In some instances, the status values are added and stored in the table under a new attribute. To achieve the effect of designating one specific attribute as a unique key, without polluting the original values (or characters) corresponding to the specific attribute, the key management module 630 may set the combination of the specific attribute and the status attribute as a composite unique key. The techniques can be applied in scenarios that multiple attributes are designated by a user request as unique keys, by making each attribute combine with the status attribute as a composite unique key.

After the table is updated with the status attribute and corresponding status values, the modified table or changes are written back to the data store 610 from memory and/or via the data storage module 620. These updates may permanently overwrite the original table in the data store 610.

In some instances, the request may be sent to the network 640 to update values saved in a specific attribute of a table, update a record in the table, or update a uniqueness status of a specific attribute. The logical structure 600 is also capable of responding to the request. For example, the key generation and update component 632 may be utilized to generate new keys to substitute the encryption keys for the security communication module 650. A similar process as above can be used to perform to update the encryption keys and sent back the updated encryption keys to the security communication module 650. In some instances, the security communication module 650 encrypts the response and sends it back to the client device 660. In some instances, a decryption rule or a decryption key may be stored in the client device 660 to decrypts the response.

Figure 7:
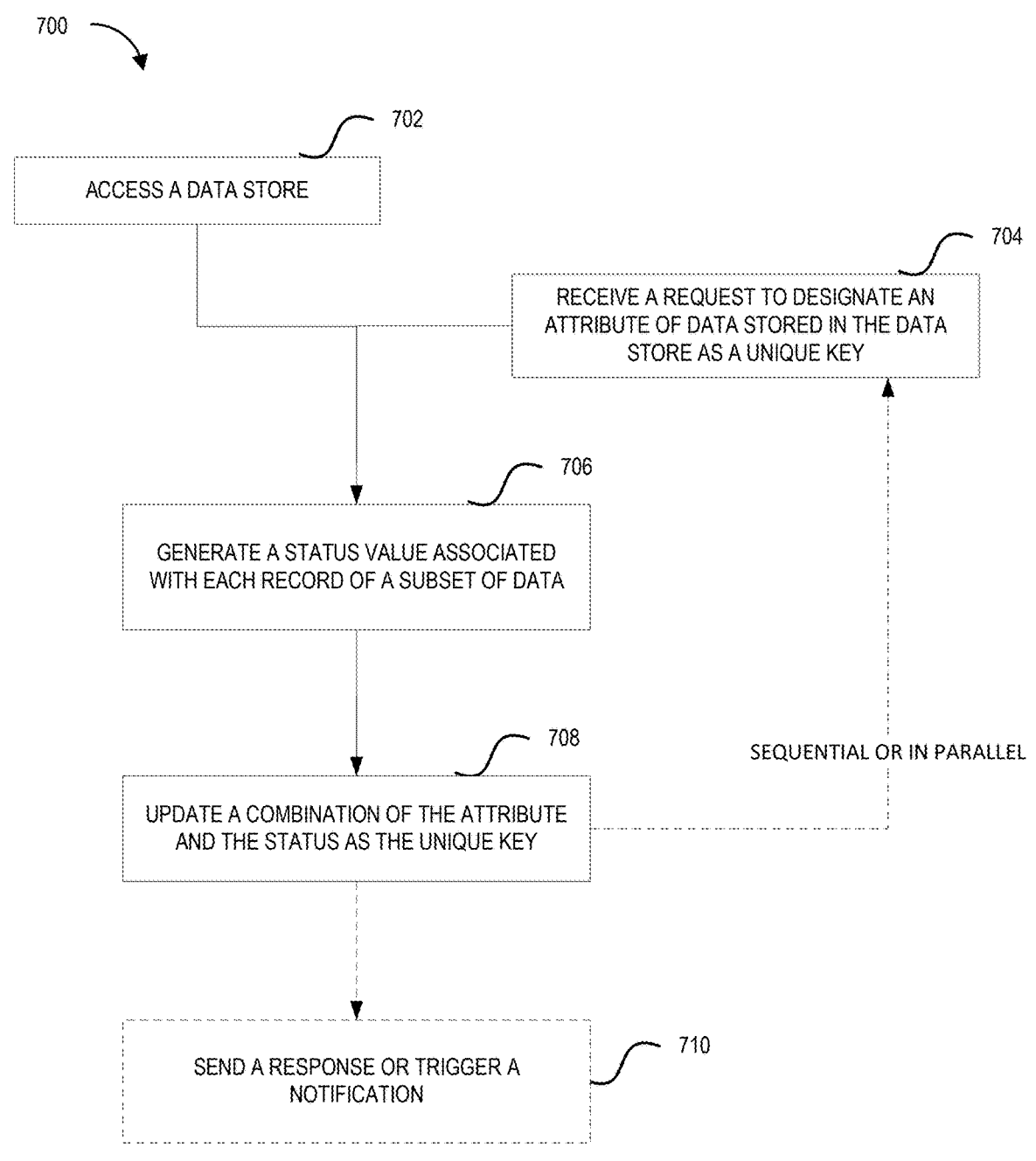
FIG. 7 shows an example process of generating and verifying dynamically adapted unique keys.

Referring now to FIG. 7, FIG. 7 shows an example process 700 of generating and verifying dynamically adapted unique keys. At block 702, a data store is accessed. The data store may be the data store 610 described with regard to FIG. 6, or a component of the key management system 310 described with regard to FIG. 3.

Data in the data store may be in the format of tables, arrays, collections, fields, objects, data files, or any similar suitable format, so that features corresponding to the data can be easily accessed, queried, verified, or otherwise managed. For example, MySQL as a type of data store organizes data into different relational databases. Each database is a separate entity that contains tables, views, stored procedures, functions, and other objects. For a table in a database, for example, the table 403 shown in FIG. 4, data is stored in rows and columns, providing a structured way to store, manage, and retrieve the data. In some instances, each row or entry corresponds to a record (e.g., the record 406 shown in FIG. 4), and each column corresponds to an attribute or feature. In some instances, the data store is stored in a database, a memory, or a combination thereof. Databases are used for persistent storage and can handle large volumes of data with complex queries. In-memory data stores are used for faster data access and/or process, and temporary storage. They can be used for session storage and real-time data processing. Many systems may use a combination of both databases and in-memory data stores to balance the need for persistence with the need for speed. For example, the key management system 310 described with regard to FIG. 3 might use an in-memory cache to store frequently accessed data while relying on a database for long-term storage.

At block 704, a request is received, and the request designates an attribute of the data stored in the data store as a unique key. The request may come from the client device 660 described with regard to FIG. 6, or may be communicated using the security communication module 650 described with regard to FIG. 6. The request may be received by a key management system through a network, as shown in FIGS. 3 and 6. In some instances, the request also includes updating a status of a record, updating values corresponding to the unique key, and retrieve a record or a portion thereof from the data store.

As shown in FIG. 7, operations at block 702 do not need to be performed before the performance of operations at block 704. For example, a request may be received at block 704 first, and then the data store is accessed at block 702. In some instances, the access of data stores at block 702 may also be performed using the same key management system, as used at block 704.

At block 706, a status value associated with each record of a subset of the data stored in the data store is generated. The status value is a non-conflicting number or string. The subset of the data may correspond to soft-deleted records that are not permanently deleted. It should be understood that the subset of the data may include all data or records. Different approaches or key rules may be used to generate the status values. The key rules and the approaches are described above with respect to FIG. 6. For example, the status values can be generated based on one or more approaches in a group consisting of: (i) a timestamp-based approach, (ii) a hash-based approach, (iii) an auto-increment approach, (iv) a random number generator approach, (v) an external system approach, and (vi) a custom-designed algorithm approach. The key rules and/or the approaches may be accessed or retrieved from, the key rule store 636 described with respect to FIG. 6. In some instances, the status values are generated using the same key management system, for example, a system having the logical structure 600 as shown in FIG. 6. The generated status values may be temporarily stored in the same memory where the data store is stored, or a different memory in the key management system. In some instances, a "status" attribute may be generated and added to a table in the data store before the generation of non-conflicting status values.

At block 708, a combination of the designated attribute and the status attribute is set or updated as a composite unique key, and the update may be performed using the key management system. These techniques described with respect to FIG. 7 ensure that each value in the record corresponding to the designated attribute can pass a uniqueness verification process, even the values corresponding to the designated attribute trigger conflicts. When a query is sent to the system to retrieve or activate a record that has been soft-deleted, the system can easily identify the record and/or activate the record using the unique key value corresponding to the unique key.

In some instances, a set of requests may be received by the system to perform different operations. In some instances, the requests are received and subsequent operations (e.g., operations at blocks 706 and 708) are performed in a sequence. That is, the system may receive a first request at block 702 and perform operations at blocks 706 and 708 before receiving a second request. In some instances, the requests are received and subsequent operations (e.g., operations at blocks 706 and 708) are performed in parallel. That is, at the same time a first request is received, a second request can be received and subsequent operations corresponding to the blocks 706 and 708 can be performed. Different unique keys may be generated using operations at blocks 702-708.

When the requests include a request to add a record to the data, values corresponding to the record may be accessed and a key rule may be used by the key management system to determine if any of the values corresponding to the record violate other existing key rules. When it is determined that there is a collision by introducing the record, a status value may be generated for the record using a same or similar approach as used at block 706. When it is determined that there is no collision by introducing the record, the status value can still be generated and associated with the record. In some instances, the status value corresponding to the record is set to be "0."

In some instance, records that have not been soft-deleted may be identified or selected using the key management system. Status values corresponding to those records may be generated using a different key rule or approach, as the status value generated for the soft-deleted records. In some instances, a status value of 0 may be generated and stored associated with each record.

In some instances, valid or active records may be set to be soft-deleted. The key management system may update the status values (e.g., 0s) corresponding to the records using an approach described with respect to block 706. The soft-deletion process may also be achieved using a different approach described with respect to block 706.

At optional block 710, a response to the request may be sent via the network and using the client device to the user who initiates the process 700. In some instances, a notification is triggered by the accomplishment of the request and demonstrated to the user using the client device via a graphical user interface (GUI). The notification may notify the user that a request has been accepted, processed, or a response has been generated. The notification may provide further information, such as an authorization to access the data store, a failure to access the data store, a conflict in the unique keys generated, and the like.

Figure 8:
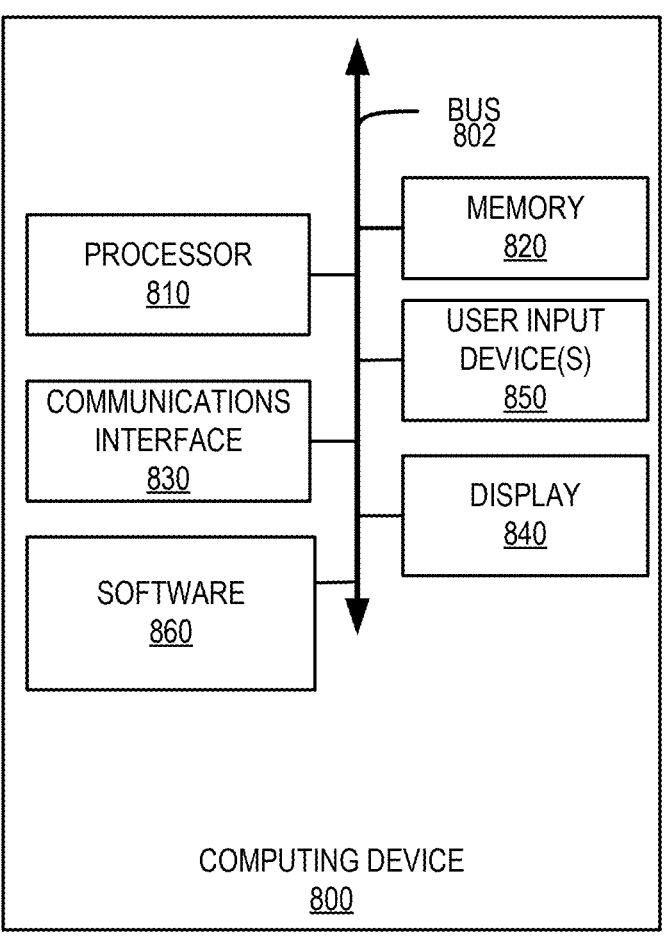
FIG. 8 shows an example computing device suitable for generation and verification of dynamically adapted unique keys, according to certain examples.

Now referring to FIG. 8, FIG. 8 shows an example computing device 800 suitable for generation and verification of dynamically adapted unique keys. The example computing device 800 includes a processor 810 which is in communication with the memory 820 and other components of the computing device 800 using one or more communications buses 802. The processor 810 is configured to execute processor-executable instructions stored in the memory 820 to perform one or more methods for generation and verification of dynamically adapted unique keys, such as part or all of the example processes 700, described above with respect to FIG. 7. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user. The computing device 800 may also include a software 860. The software 860 may include a communication application (client application), a communication platform, and any other software to enable communication from a first user to a second user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure.

The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A computer-implemented method comprising:
accessing a data store, wherein the data store is stored in a database, a memory or a combination thereof;
receiving, by a key management system, a first request from a user to designate a first attribute of data in the data store as a first unique key;
generating, using the key management system, a status value associated with each record of a subset of the data, wherein the status value comprises a non-conflicting number or string; and
updating, using the key management system, the first attribute and its associated status as the first unique key.

2. The computer-implemented method of claim 1, wherein records corresponding to the subset of the data have been soft-deleted.

3. The computer-implemented method of claim 1, further comprising:
receiving, by the key management system, a second request from the user to designate a second attribute of data in the data store as a second unique key; and
updating, using the key management system, the second attribute and the status value as the second unique key.

4. The computer-implemented method of claim 1, further comprising:
receiving, by the key management system, a third request from the user to add a record to the data, wherein the record comprises a value corresponding to the first attribute;
determining, using the key management system, whether the value is different from each of existing values corresponding to the first attribute, wherein associated status values of the existing values corresponding to the first attribute is 0;
in response to the determination, (i) when the value is not different from each of the existing values, generating a status value associated with the record, wherein the status value is different from status values associated with each entry of a subset of the data, or (ii) when the value is different from each of the existing values, generating a status value of 0 associated with the record; and
storing the record and its associated status value in the data store.

5. The computer-implemented method of claim 1, further comprising:
selecting, by the key management system, a set of records from the data, wherein each record has not been soft-deleted; and generating, using the key management system, a status value of 0 associated with each record.

6. The computer-implemented method of claim 5, further comprising:
receiving, by the key management system, a fourth request from the user to soft-delete a record from the set of records;
generating, using the key management system, a substitute status value associated with the record to substitute the status value of 0, wherein the substitute status value is different from each status value associated with each entry of the subset of the data; and
outputting, through a network to a client device, a notification to the user that the record has been soft-deleted.

7. The computer-implemented method of claim 1, wherein the status value is generated based on one or more approaches in a group consisting of: (i) a timestamp-based approach, (ii) a hash-based approach, (iii) an auto-increment approach, (iv) a random number generator approach, (v) an external system approach, and (vi) a custom-designed algorithm approach.

8. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
access a data store, wherein the data store is stored in a database, a memory or a combination thereof;
receive, by a key management system, a first request from a user to designate a first attribute of data in the data store as a first unique key;
generate, using the key management system, a status value associated with each record of a subset of the data, wherein the status value comprises a non-conflicting number or string; and
update, using the key management system, the first attribute and its associated status as the first unique key.

9. The system of claim 8, wherein records corresponding to the subset of the data have been soft-deleted.

10. The system of claim 8, the one or more processors are configured to execute further processor-executable instructions stored in the non-transitory computer-readable medium to:
receive, by the key management system, a second request from the user to designate a second attribute of data in the data store as a second unique key; and
update, using the key management system, the second attribute and the status value as the second unique key.

11. The system of claim 8, the one or more processors are configured to execute further processor-executable instructions stored in the non-transitory computer-readable medium to:
receive, by the key management system, a third request from the user to add a record to the data, wherein the record comprises a value corresponding to the first attribute;
determine, using the key management system, whether the value is different from each of existing values corresponding to the first attribute, wherein associated status values of the existing values corresponding to the first attribute is 0;

in response to the determination, (i) when the value is not different from each of the existing values, generate a status value associated with the record, wherein the status value is different from status values associated with each entry of a subset of the data, or (ii) when the value is different from each of the existing values, generating a status value of 0 associated with the record; and store the record and its associated status value in the data store.

12. The system of claim 8, the one or more processors are configured to execute further processor-executable instructions stored in the non-transitory computer-readable medium to:

select, by the key management system, a set of records from the data, wherein each record has not been soft-deleted; and generate, using the key management system, a status value of 0 associated with each record.

13. The system of claim 12, the one or more processors are configured to execute further processor-executable instructions stored in the non-transitory computer-readable medium to:

receive, by the key management system, a fourth request from the user to soft-delete a record from the set of records;

generate, using the key management system, a substitute status value associated with the record to substitute the status value of 0, wherein the substitute status value is different from each status value associated with each entry of the subset of the data; and output, through a network to a client device, a notification to the user that the record has been soft-deleted.

14. The system of claim 8, wherein the status value is generated based on one or more approaches in a group consisting of: (i) a timestamp-based approach, (ii) a hash-based approach, (iii) an auto-increment approach, (iv) a random number generator approach, (v) an external system approach, and (vi) a custom-designed algorithm approach.

15. A non-transitory computer-readable medium comprising processor-executable instructions configured to cause one or more processors to:

access a data store, wherein the data store is stored in a database, a memory or a combination thereof;

receive, by a key management system, a first request from a user to designate a first attribute of data in the data store as a first unique key;

generate, using the key management system, a status value associated with each record of a subset of the data, wherein the status value comprises a non-conflicting number or string; and update, using the key management system, the first attribute and its associated status as the first unique key.

16. The non-transitory computer-readable medium of claim 15, wherein records corresponding to the subset of the data have been soft-deleted.

17. The non-transitory computer-readable medium of claim 15, further comprising processor-executable instructions configured to cause one or more processors to:

receive, by the key management system, a second request from the user to designate a second attribute of data in the data store as a second unique key; and update, using the key management system, the second attribute and the status value as the second unique key.

18. The non-transitory computer-readable medium of claim 15, further comprising processor-executable instructions configured to cause one or more processors to:

receive, by the key management system, a third request from the user to add a record to the data, wherein the record comprises a value corresponding to the first attribute;

determine, using the key management system, whether the value is different from each of existing values corresponding to the first attribute, wherein associated status values of the existing values corresponding to the first attribute is 0;

in response to the determination, (i) when the value is not different from each of the existing values, generate a status value associated with the record, wherein the status value is different from status values associated with each entry of a subset of the data, or (ii) when the value is different from each of the existing values, generating a status value of 0 associated with the record; and store the record and its associated status value in the data store.

19. The non-transitory computer-readable medium of claim 15, further comprising processor-executable instructions configured to cause one or more processors to:

select, by the key management system, a set of records from the data, wherein each record has not been soft-deleted;

generate, using the key management system, a status value of 0 associated with each record;

receive, by the key management system, a fourth request from the user to soft-delete a record from the set of records;

generate, using the key management system, a substitute status value associated with the record to substitute the status value of 0, wherein the substitute status value is different from each status value associated with each entry of the subset of the data; and output, through a network to a client device, a notification to the user that the record has been soft-deleted.

20. The non-transitory computer-readable medium of claim 15, wherein the status value is generated based on one or more approaches in a group consisting of: (i) a timestamp-based approach, (ii) a hash-based approach, (iii) an auto-increment approach, (iv) a random number generator approach, (v) an external system approach, and (vi) a custom-designed algorithm approach.

\* \* \* \* \*